(12) United States Patent
Mitsuya et al.

(10) Patent No.: US 9,210,539 B2
(45) Date of Patent: Dec. 8, 2015

(54) POSITION ESTIMATING APPARATUS, POSITION ESTIMATING METHOD, AND COMPUTER PROGRAM PRODUCT

(75) Inventors: Koshiro Mitsuya, Tokyo (JP); Atsushi Shionozaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 219 days.

(21) Appl. No.: 13/817,625

(22) PCT Filed: Aug. 24, 2011

(86) PCT No.: PCT/JP2011/004687
§ 371 (c)(1),
(2), (4) Date: Feb. 19, 2013

(87) PCT Pub. No.: WO2012/032725
PCT Pub. Date: Mar. 15, 2012

(65) Prior Publication Data
US 2013/0143597 A1    Jun. 6, 2013

(30) Foreign Application Priority Data

Sep. 9, 2010 (JP) ................................. 2010-202198

(51) Int. Cl.
| | |
|---|---|
| *H04W 24/00* | (2009.01) |
| *H04W 4/02* | (2009.01) |
| *G01C 21/28* | (2006.01) |
| *G01S 5/14* | (2006.01) |

(52) U.S. Cl.
CPC ................ *H04W 4/02* (2013.01); *G01C 21/28* (2013.01); *G01S 5/14* (2013.01)

(58) Field of Classification Search
None
See application file for complete search history.

(56) References Cited

U.S. PATENT DOCUMENTS

| 6,865,395 | B2 | 3/2005 | Riley |
| 2004/0092270 | A1 | 5/2004 | Banno |
| 2004/0172190 | A1 | 9/2004 | Tsunehara et al. |
| 2006/0194593 | A1 | 8/2006 | Drabeck et al. |

(Continued)

FOREIGN PATENT DOCUMENTS

| CN | 101187701 A | 5/2008 |
| EP | 1 418 439 A1 | 5/2004 |

(Continued)

OTHER PUBLICATIONS

Combined Office Action and Search Report issued Dec. 16, 2013 in Chinese Patent Application No. 201180042196.5 (with English translation).
International Search Report issued Nov. 29, 2011, in PCT/JP2011/004687.
Singapore Written Opinion and Search Report issued May 8, 2014 in Patent Application No. 201300850-3.
Extended European Search Report issued Jun. 10, 2014 in Patent Application No. 11823206.5.

*Primary Examiner* — Suhail Khan
(74) *Attorney, Agent, or Firm* — Oblon, McClelland, Maier & Neustadt, L.L.P.

(57) ABSTRACT

An apparatus, method and computer program storage device cooperate to provide a quality position estimation of a mobile communication device by determining a reference area. The reference area includes the position of the mobile communication device as well as a plurality of transmitters. Transmitters that are detected as being outside of the reference area are excluded from contributing to the position estimate. The reference area is centered at a standard position, which may be a previous position or a GPS based position, for example. The range of the reference area includes a component that considers the range of a transmitter, as well as a GPS error or an estimated move distance of the mobile communication device.

20 Claims, 17 Drawing Sheets

(56) References Cited

U.S. PATENT DOCUMENTS

| | | |
|---|---|---|
| 2006/0234722 A1 | 10/2006 | Hanebeck et al. |
| 2006/0247890 A1 | 11/2006 | Oguri et al. |
| 2008/0134303 A1 | 6/2008 | Rekimoto |
| 2009/0002237 A1 | 1/2009 | Nonoyama |
| 2010/0039929 A1 | 2/2010 | Cho et al. |
| 2010/0123626 A1 | 5/2010 | Yano |
| 2010/0253536 A1 | 10/2010 | Shionozaki |
| 2011/0207473 A1* | 8/2011 | Swaminathan et al. ... 455/456.1 |
| 2011/0250875 A1* | 10/2011 | Huang et al. ............... 455/418 |
| 2012/0184295 A1 | 7/2012 | Mitsuya et al. |
| 2012/0252500 A1 | 10/2012 | Mitsuya et al. |

FOREIGN PATENT DOCUMENTS

| | | |
|---|---|---|
| EP | 1 452 887 A2 | 9/2004 |
| JP | 2002-77976 | 3/2002 |
| JP | 2006-86631 | 3/2006 |
| JP | 2008-104029 | 5/2008 |
| WO | WO 03/086005 A1 | 10/2003 |

* cited by examiner

Fig. 3

| BASE STATION ID | SIGNAL STRENGTH INFORMATION |
|---|---|
| 30A | -90dBm |
| 30B | -70dBm |
| 30C | -80dBm |
| ⋮ | ⋮ |

Fig. 6

| ESTIMATION TIME | ESTIMATED POSITION |
|---|---|
| ⋮ | ⋮ |
| 2010/7/20 12:20:22 | POSITION INFORMATION M |
| 2010/7/20 14:12:32 | POSITION INFORMATION N |

Fig. 13

| REPORT TIME | LOW RELIABILITY BASE STATION ID |
|---|---|
| 2010/7/14 10:34:56 | 30X |
| 2010/7/15 13:20:24 | 30Y |
| 2010/7/15 20:30:11 | 30X |
| 2010/7/17 8:40:54 | 30A |
| 2010/7/18 13:10:22 | 30X |
| 2010/7/18 20:43:14 | 30X |
| ⋮ | ⋮ |

Fig. 14

| MOBILE BASE STATION ID |
|---|
| ... |
| ... |
| 30X |

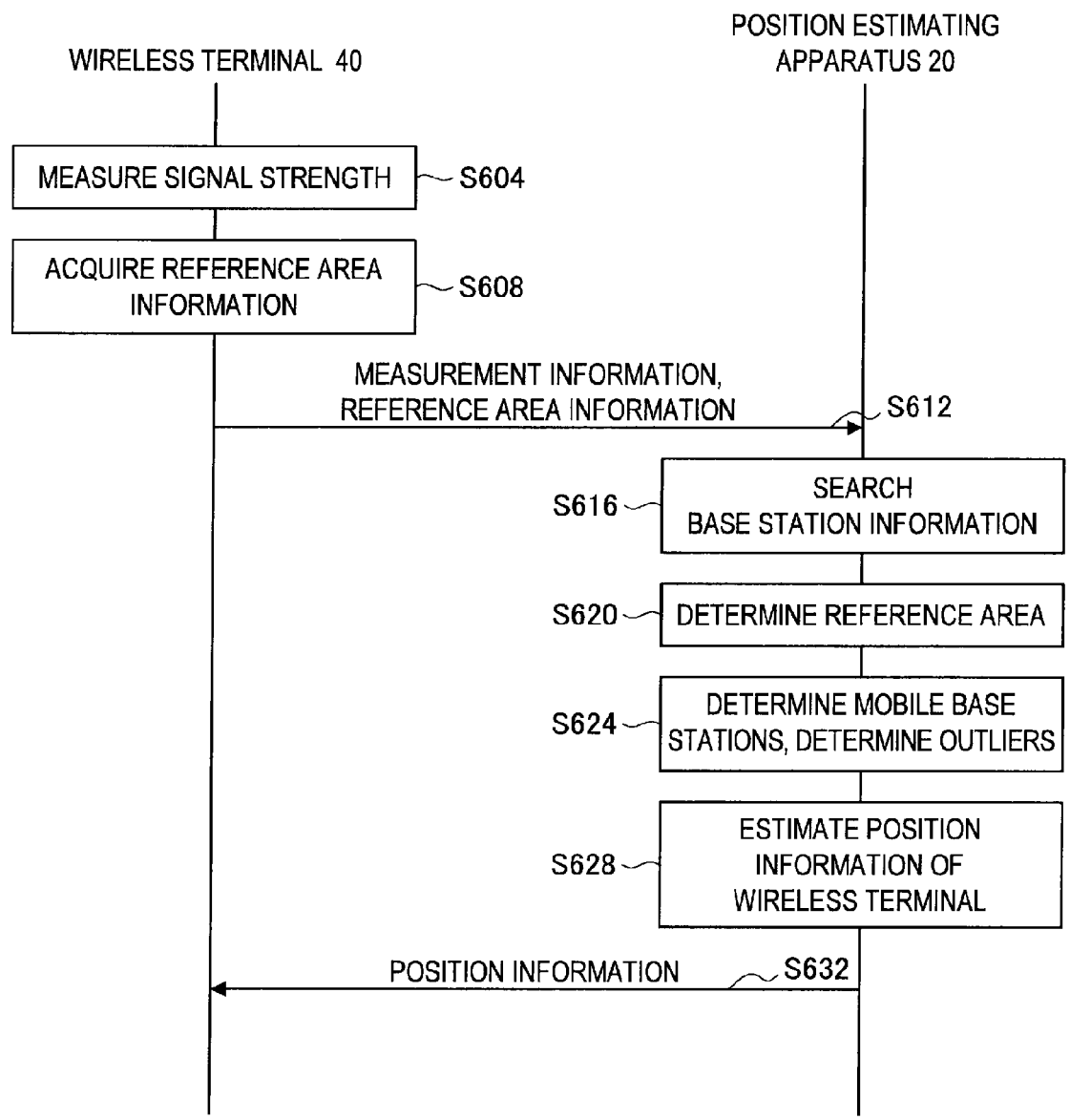

POSITION ESTIMATING APPARATUS, POSITION ESTIMATING METHOD, AND COMPUTER PROGRAM PRODUCT

TECHNICAL FIELD

The present disclosure relates to a position estimating apparatus, a position estimating method, and a computer program product.

BACKGROUND ART

Recently, receiver apparatuses capable of receiving wireless signals transmitted from satellites have been installed in moving bodies such as vehicles, mobile telephones, and the like. By using GPS (Global Positioning System) positioning, it is possible to estimate the position of the moving body in which the receiver apparatus is installed. Such position estimating technology that uses a receiver apparatus is an important base technology in a wide range of fields such as navigation, security and entertainment. However, position estimating technology based on GPS positioning requires a long time at startup for supplementary synchronization and is difficult to use inside buildings and underground that are out of range for the wireless signals from satellites.

Also, as disclosed in Japanese Laid-Open Patent Publication No. 2008-104029 for example, a method of estimating the position of a wireless terminal based on the signal strength at the wireless terminal of wireless signals transmitted from base stations on a wireless LAN (Local Area Network) has been proposed. More specifically, it is possible to estimate the position of the wireless terminal based on position information of respective base stations registered in advance and the distances between the base stations and the wireless terminal calculated from the respective signal strengths of the wireless signals. Since base stations on a wireless LAN are also set up inside buildings and underground, by using this method of estimating, it is possible to carry out position estimation inside buildings and underground which has been difficult for position estimating technology based on GPS positioning.

CITATION LIST

Patent Literature

PTL 1: JP 2008-104029A

SUMMARY

Technical Problem

However, a case can be imagined where, due to movement of the base station or the like, the registered base station position information is erroneous. If position estimation is carried out based on such erroneous base station position information, the precision of the position estimation will fall. Such concern has significantly increased in recent years due to the spread of mobile base stations that are carried by the user.

The present disclosure aims to provide a novel and improved position estimating apparatus, position estimating method, and computer program product that are capable of suppressing a fall in the precision of position estimation.

Solution to Problem

According to one embodiment, a position estimation apparatus includes
a reference area determining unit determines a reference area that includes a position of a mobile communications station, and
a position estimation unit that estimates the position of the mobile communication station based on position information of a plurality of transmitters within the reference area.

One aspect of the apparatus is that the reference area determining unit determines the reference area by combining an estimated move distance of the apparatus with a predetermined communication range of at least one of the plurality of transmitters.

Another aspect is that the apparatus includes a movement detector that estimates the estimated move distance of the apparatus.

Another aspect is that the movement detector being an accelerometer.

According to a different aspect, the apparatus includes a GPS-based location device that detects location information based on wireless satellite transmissions, wherein
the reference area determining unit determines the reference area by combining a GPS uncertainty amount with a predetermined communication range of at least one of the plurality of transmitters.

According to another aspect, the device includes
a computer readable storage device that stores a previous position estimation result for the apparatus in association with time, wherein
and the reference area determining unit determines the reference area by using the previous position estimation result as a standard.

According to another aspect, the reference area determining unit determines the reference area by calculating the estimated move distance.

According to another aspect the position estimation unit estimates the move distance by measuring a propagation distance from the plurality of transmitters.

According to another aspect the position estimation unit excludes from consideration transmitters outside of the reference area based on signal information from respective of the plurality of transmitters.

According to another aspect the position estimation unit estimates the position of the mobile communication station by calculation of $$O = \frac{1}{W} \cdot \sum_i (W_i \cdot A_i) \quad \text{(Mathematical Formula 1)}$$

$$W_i = \frac{1}{distS(O, A_i)} \quad \text{(Mathematical Formula 2)}$$

$$W = \sum_i W_i, \quad \text{(Mathematical Formula 3)}$$

wherein
O being a position, $A_i$ being position information of an ith transmitter, and $W_i$ being a weighting coefficient.

According to another aspect the apparatus also includes a computer readable storage unit that stores transmitter reliability information regarding whether a particular transmitter has been detected as having a low reliability with at least a predetermined frequency of occurrence, and the position estimation unit excludes transmitters having a stored reliability below a predetermined threshold when estimating the position of the mobile communication station.

According to another aspect, the position estimation unit excludes transmitters having a received signal characteristic indicating the transmitter is outside of the reference area.

The apparatus may also include a communications interface that receives transmitter signal information and reference area information from the mobile communication station, and sends an estimate of the position of the mobile communication station to the mobile communication station.

Optionally, the apparatus includes the mobile communication station.

In a process based embodiment, the method includes determining with a processing device a reference area including a position of a mobile communications station; and estimating the position of the mobile communication station based on position information of a plurality of transmitters within the reference area.

According to a computer readable storage device embodiment, the device has computer readable instructions that when executed by a processing device perform a position estimation method comprising:

determining with the processing device a reference area including a position of a mobile communications station; and estimating the position of the mobile communication station based on position information of a plurality of transmitters within the reference area.

In a mobile communications device embodiment, the device includes a receiver that receives transmissions from a plurality of transmitters;

a reference area determining unit that determines a reference area that includes therein a position of the mobile communications station; and a communication interface that sends signal information from the transmissions of the plurality of transmitters, and the reference area to a remote device, and receives from the remote device an estimated position of the mobile communication station after the remote device used the signal information and reference area to estimate the position of the mobile communication station by using transmissions from a subset of the plurality of transmitters located within the reference area and excluding transmissions from a subset of the plurality of transmitters located outside of the reference area.

In an apparatus-centric embodiment, that communications with a remote device, optionally available as a cloud resource, the method includes receiving transmissions from a plurality of transmitters;

determining with a processing device a reference area that includes therein a position of the mobile communications station;

sending signal information from the transmissions of the plurality of transmitters to a remote device;

sending the reference area to the remote device; and receiving from the remote device an estimated position of the mobile communication station after the remote device used the signal information and reference area to estimate the position of the mobile communication station by using transmissions from a subset of the plurality of transmitters located within the reference area and excluding transmissions from a subset of the plurality of transmitters located outside of the reference area.

In an apparatus-centric embodiment, that communications with a remote device, optionally available as a cloud resource, instructions are stored on a computer readable medium that when executed by a processing device perform a position estimation method comprising:

receiving transmissions from a plurality of transmitters;

determining with a processing device a reference area that includes therein a position of the mobile communications station;

sending signal information from the transmissions of the plurality of transmitters to a remote device;

sending the reference area to the remote device; and receiving from the remote device an estimated position of the mobile communication station after the remote device used the signal information and reference area to estimate the position of the mobile communication station by using transmissions from a subset of the plurality of transmitters located within the reference area and excluding transmission from a subset of the plurality of transmitters located outside of the reference area.

Advantageous Effects of Invention

According to embodiments of the present disclosure described above, it is possible to suppress a fall in the precision of position estimation.

BRIEF DESCRIPTION OF DRAWINGS

FIG. 3 is a diagram useful in explaining specific examples of measurement information.

FIG. 6 is a diagram useful in explaining specific examples of position estimation results stored by an estimation result storage unit.

FIG. 13 is a diagram useful in showing specific examples of low reliability base station information stored by a low reliability base station information storage unit.

FIG. 14 is a diagram useful in showing specific examples of mobile base station information stored by a mobile base station information storage unit.

FIG. 19 is a sequence chart showing the operation of the position estimating system according to the fourth embodiment.

DESCRIPTION OF EMBODIMENTS

Figures 1, 2:
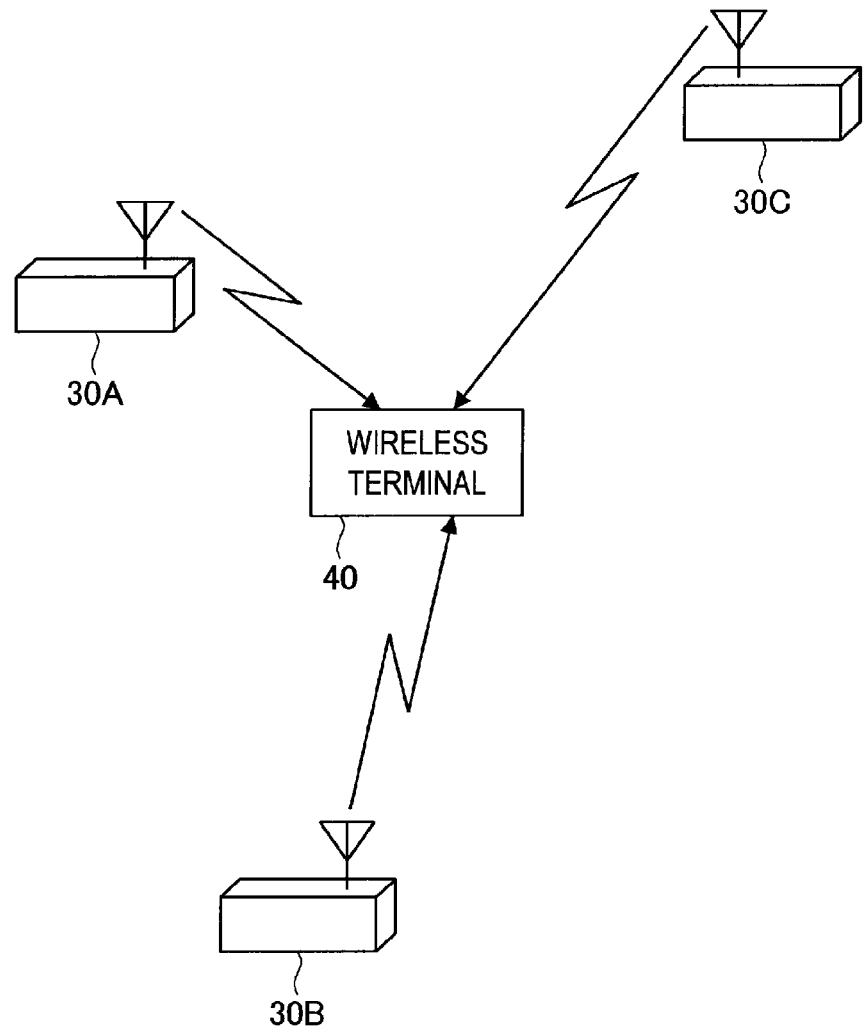
FIG. 1 is a diagram useful in explaining the configuration of a position estimating system according to embodiments of the present disclosure.
FIG. 2 is a diagram useful in explaining specific examples of position information of base stations stored by a wireless terminal.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Also, in the present specification and drawings, in some cases a plurality of structural elements that have effectively the same functional configuration are distinguished from one another by appending different letters to the same reference numeral. For example, a plurality of structural elements with effectively the same functional configuration are distinguished as necessary as the "base stations 30A, 30B, and 30C". However, when it is not especially necessary to distinguish between the plurality of structural elements with effectively the same functional configuration, the same reference numeral is used. For example, the base stations 30A, 30B, and 30C are referred to simply as the "base station 30" when it is not especially necessary to distinguish between them.

Embodiments of the present disclosure will now be described in the order indicated below.

1. Fundamental Configuration of Position Estimating System
2. First Embodiment
2-1. Configuration of Wireless Terminal According to First Embodiment
2-2. Operation of Wireless Terminal According to First Embodiment
3. Second Embodiment
3-1. Configuration of Wireless Terminal According to Second Embodiment
3-2. Operation of Wireless Terminal According to Second Embodiment
4. Third Embodiment
4-1. Configuration of Wireless Terminal According to Third Embodiment
4-2. Operation of Wireless Terminal According to Third Embodiment
5. Fourth Embodiment
5-1. Configuration of Position Estimating System According to Fourth Embodiment
5-2. Configuration of Position Estimating Apparatus According to Fourth Embodiment
5-3. Operation of Position Estimating System According to Fourth Embodiment
6. Conclusion

1. FUNDAMENTAL CONFIGURATION OF POSITION ESTIMATING SYSTEM

As described in detail below in the "2. First Embodiment" to "5. Fourth Embodiment" sections for example, the present disclosure has a variety of possible implementations. The "position estimating apparatus 20" or "wireless terminal 40" according to such embodiments includes:

(1) a base station information storage unit (216, 416) that stores position information for base stations; and (2) a position estimating unit (236, 436) that estimates measurement information of wireless signals based on the position information of base stations whose position information stored in the base station information storage unit is in a limited range and measurement information for the signal strengths of wireless signals transmitted from such base stations.

First, the fundamental configuration that is common to the respective embodiments will be described with reference to FIGS. 1 to 3.

FIG. 1 is a diagram useful in explaining the configuration of a position estimating system 1 according to the embodiments of the present disclosure. As shown in FIG. 1, the position estimating system 1 according to the embodiments of the present disclosure includes a plurality of base stations 30 and a wireless terminal 40.

Each base station 30 controls communication between communication apparatuses that are spatially distributed. As examples, the base stations 30 are capable of controlling wireless communication between the wireless terminal 40 and another wireless terminal (not shown) that are both located in the respective signal ranges of the base stations 30 and/or controlling communication between the wireless terminal 40 and a communication apparatus that is connected by wires to a base station 30. More specifically, the base stations 30 may be base stations on a wireless LAN (Local Area Network) based on WiFi (Wireless Fidelity) Standard, LTE (Long Term Evolution) base stations, GSM (Global System for Mobile Communications) base stations, or BLUETOOTH (registered trademark) base stations.

In addition, the base stations 30 form a wireless network by regularly transmitting a beacon signal, for example. Here, the expression "beacon signal" includes a beacon signal including a base station ID identifying each base station 30. This means that it is possible for the wireless terminal 40 to specify the base station 30 that transmitted a beacon signal that has been received from the base station ID included in the beacon signal.

The wireless terminal 40 is capable of wirelessly transmitting and receiving various data in accordance with control by the base stations 30. For example, the wireless terminal 40 is capable of receiving content data from a content distribution server (not shown) and/or transmitting and receiving electronic mail to or from another wireless terminal via the base stations 30. Note that various data, for example, audio data (such as music, a performance, or a radio program), image data (such as a movie, a television program, a video program, photographs, artwork, or drawings), games, and software, can be given as examples of the content data.

As examples, the wireless terminal 40 may be an information processing apparatus such as a PC (personal computer), a home video processing apparatus (a DVD recorder, video deck, or the like), a mobile telephone, a PHS (Personal Handyphone System), a mobile music player, a mobile video processing apparatus, a PDA (Personal Digital Assistant), a home game console, a mobile game console, or a home appliance.

When a wireless signal (for example, a beacon signal) transmitted from a base station 30 is received, the wireless terminal 40 is also capable of measuring the signal strength of such wireless signal. The wireless terminal 40 also stores position information for the respective base stations 30 and is capable of estimating the position of the wireless terminal 40 based on the position information of the respective base stations 30 and the measurement information for the wireless signals. Specific examples of the position information of the respective base stations 30 stored by the wireless terminal 40 and the measurement information will now be described.

FIG. 2 is a diagram useful in explaining specific examples of the position information of the base stations 30 stored by the wireless terminal 40. As shown in FIG. 2, the wireless terminal 40 stores base station information of a plurality of base stations 30 made up of base station IDs and position information. Note that in the present specification, for ease of explanation, it is assumed that the code assigned to each base station and the base station ID are the same.

Although the position information is shown in simplified form as "position information A" and "position information B" in FIG. 2, the position information may be expressed by a format using latitude and longitude, a format using x and y coordinates, a format using absolute coordinates, a format using vectors, or the like.

FIG. 3 is a diagram useful in showing specific examples of the measurement information. As shown in FIG. 3, the measurement information includes signal strength information for each base station 30. For example, in the example shown in FIG. 3, the signal strength at the wireless terminal 40 of a wireless signal transmitted from the base station 30A is "−90 dBm".

The wireless terminal 40 according to the embodiments of the present disclosure estimates the position information of the wireless terminal 40 based on the measurement information described earlier and the position information for each base station 30. For example, the wireless terminal 40 estimates a position O of the wireless terminal 40 in accordance with the mathematical formulas shown below.

$$O = \frac{1}{W} \cdot \sum_i (Wi \cdot Ai) \quad \text{(Mathematical Formula 1)}$$

$$Wi = \frac{1}{distS(O, Ai)} \quad \text{(Mathematical Formula 2)}$$

$$W = \sum_i Wi \quad \text{(Mathematical Formula 3)}$$

Note that "Ai" in Formula 1 shows the position information of the ith base station registered in the wireless terminal 40. Accordingly, when the position information of a base station is expressed by longitude and latitude, the wireless terminal 40 applies Formula 1 to both the longitude and the latitude. Also, as shown in Formula 2, "Wi" is a weighting coefficient obtained based on distS (O,Ai) showing the distance between the wireless terminal 40 and the ith base station estimated from the signal strength. As shown in Formula 3, W is the sum of the weighting coefficients Wi.

Note that the method of estimating the position of the wireless terminal 40 is not limited to a method using Formula 1 given above and the wireless terminal 40 may for example use the position of the base station 30 that transmitted the signal with the highest signal strength received by the wireless terminal 40 as an estimate of the position of the wireless terminal 40. Alternatively, the wireless terminal 40 may use a position at the center of the base stations 30 that have transmitted signals received with a signal strength of a specified value or higher by the wireless terminal 40 as an estimate of the position of the wireless terminal 40. It is also possible to realize highly robust estimation of the position by applying a least-squares method.

However, a case can be imagined where, due to movement of a base station 30 or the like, the position information registered for the base station 30 is erroneous. If position estimation is carried out based on such erroneous position information, the precision of the position estimation will fall. This will now be described in detail with reference to FIG. 4.

Figure 4:
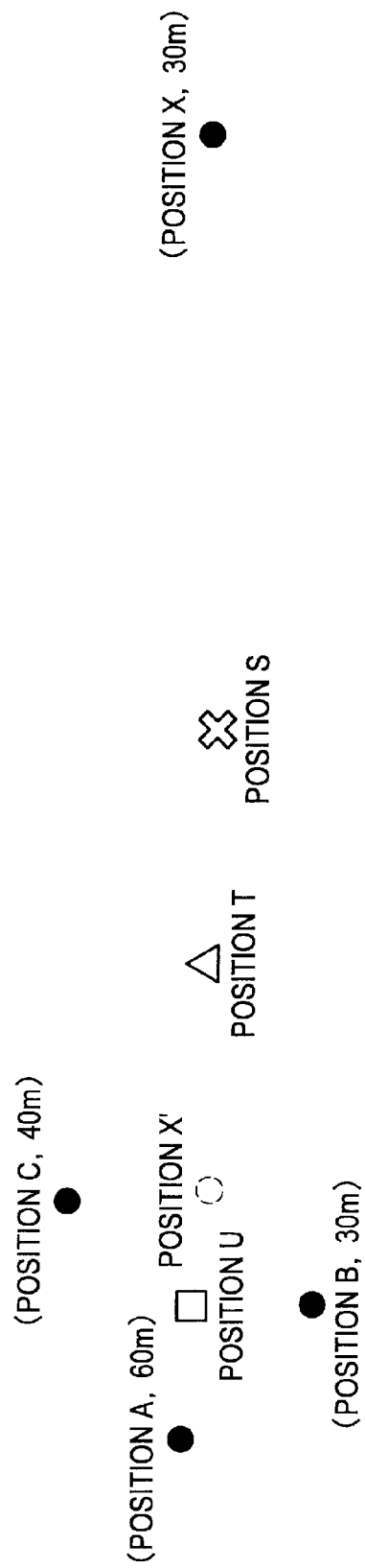
FIG. 4 is a diagram useful in showing examples of estimation results for different estimation methods.

FIG. 4 is a diagram useful in showing examples of estimation results for different estimation methods. In FIG. 4, a situation is imagined where "position information A" to "position information C" and "position information X" showing positions A to C and position X have been registered as the position information of the base station 30A to the base station 30C and the base station 30X. In this situation, a case is considered where a wireless terminal 40 located at position U receives wireless signals from the base station 30A to the base station 30C and the base station 30X and carries out position estimation of the wireless terminal 40 based on the signal strength information of the respective wireless signals.

Note that the signal strength of the wireless signal transmitted by a base station 30 falls in accordance with a specified rule as the distance from the base station 30 increases. That is, the signal strength of the wireless signal at the wireless terminal 40 can be converted into the distance between the base station 30 that transmitted such wireless signal and the wireless terminal 40. For this reason, in FIG. 4, converted distance values of the signal strengths are shown inside parentheses. Also, the base station 30X is assumed to not be present at the position X in reality and to have moved to the position X'.

Here, when the wireless terminal 40 provisionally uses the center of gravity of the registered positions of the base stations 30A to 30C and the base station 30X as an estimate of the position of the wireless terminal 40, the wireless terminal 40 will use the position S as the estimate of the position of the wireless terminal 40 in spite of the wireless terminal 40 being actually located at the position U. Also, by using a robust median method that is less affected by errors, the wireless terminal 40 is capable of obtaining a position T, for example that is closer to the actual position U of the wireless terminal 40 than the position S.

However, if position estimation for the wireless terminal 40 is carried out using the position information of the base station 30X, it is expected that the position estimation result will be distant from the actual position regardless of the estimation method used. Here, although it would be conceivably possible to carry out position estimation without using the position information of the base station 30X that is distant from the base station 30A to the base station 30C, in reality, a case where the position information of the base station 30X is correct and the position information of the base station 30A to the base station 30C is erroneous can also be imagined. For this reason, it would not be appropriate to carry out position estimation without using the position information of the base station 30X based only on the fact that the base station 30X is very distant from the other base stations 30.

By focusing on the situation described above, the embodiments of the present disclosure were conceived. By carrying out position estimation using position information of highly reliable base stations 30, the wireless terminal 40 or the position estimating apparatus 20 according to the embodiments of the present disclosure are capable of suppressing a drop in the precision of position estimation. Such embodiments of the present disclosure will now be described in detail.

Figure 5:
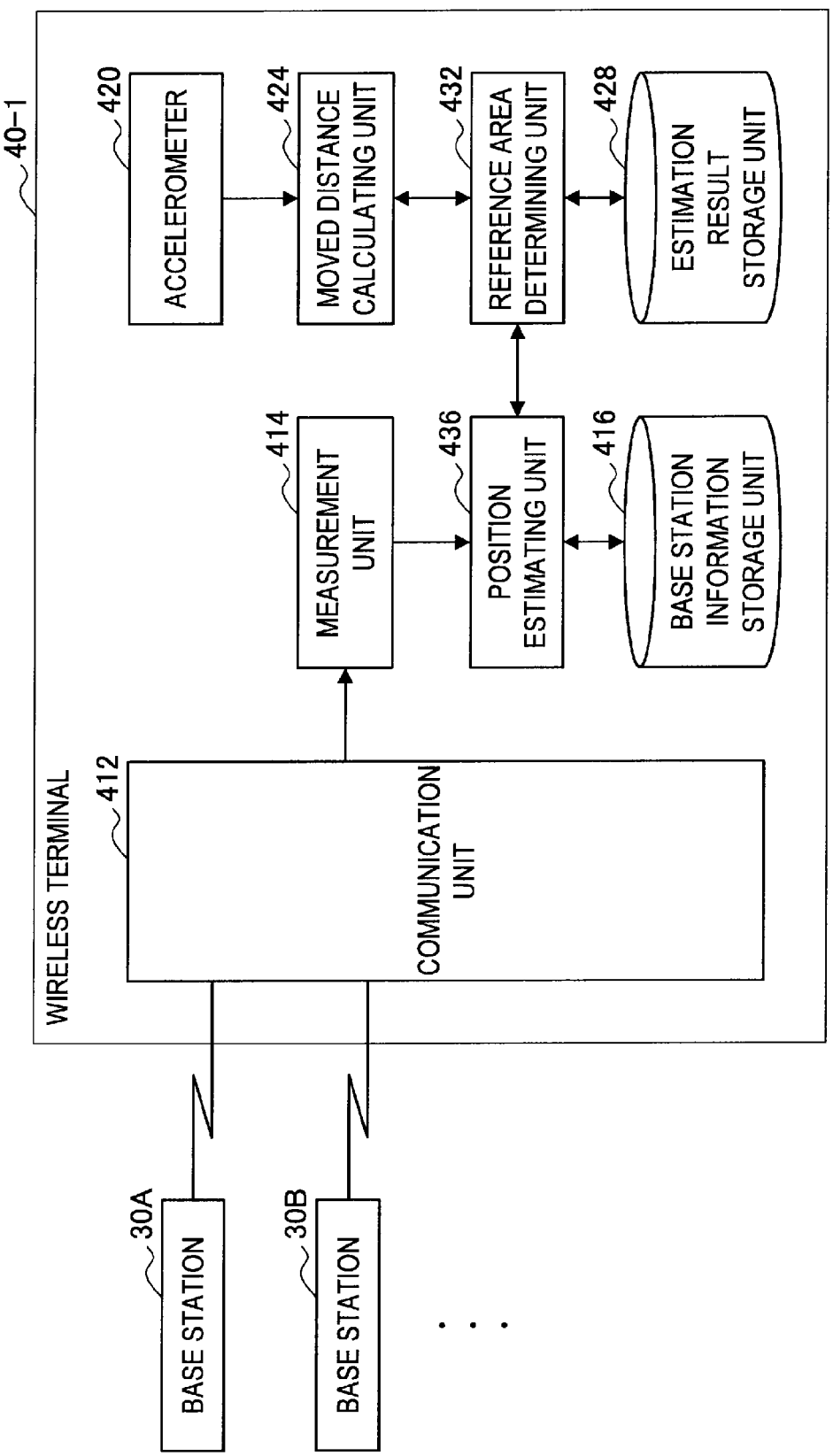
FIG. 5 is a functional block diagram showing the configuration of a wireless terminal according to a first embodiment of the present disclosure.

2. FIRST EMBODIMENT 2-1. Configuration of Wireless Terminal According to First Embodiment FIG. 5 is a functional block diagram showing the configuration of a wireless terminal 40-1 according to a first embodiment of the present disclosure. As shown in FIG. 5, the wireless terminal 40-1 according to the first embodiment includes a communication unit 412, a measurement unit 414, a base station information storage unit 416, an accelerometer 420, a moved distance calculating unit 424, an estimation result storage unit 428, a reference area determining unit 432, and a position estimating unit 436. Although described in detail later, the wireless terminal 40-1 according to the first embodiment encompasses a function as a position estimating apparatus that estimates the position of the wireless terminal 40-1.

The communication unit 412 is an interface for base stations 30 in the periphery of the wireless terminal 40-1 and functions as a reception unit that receives wireless signals transmitted from the base stations 30 and as a transmission unit that transmits wireless signals to the base stations 30.

The measurement unit 414 measures the signal strength of wireless signals received by the communication unit 412 from the respective base stations 30 separately for each transmitting base station 30. By measuring signal strength using the measurement unit 414, as one example measurement information such as that described with reference to FIG. 3 is obtained.

As described with reference to FIG. 2 for example, the base station information storage unit 416 stores base station information made up of base station IDs and position information of the respective base stations 30. Note that as examples, the base station information storage unit 416 may be a storage medium such as a nonvolatile memory, a magnetic disk, an optical disc, or an MO (Magneto Optical) disc. Here, EEPROM (Electrically Erasable Programmable Read-Only Memory) and EPROM (Erasable Programmable ROM) can be given as examples of nonvolatile memory. A hard disk, a disk-shaped magnetic disk, and the like can be given as examples of a magnetic disk. A CD (Compact Disc), a DVD-R (Digital Versatile Disc-Recordable), and a BD (Blu-Ray Disc (Registered Trademark)) and the like can be given as examples of an optical disc. Also, although the base station information storage unit 416 and the estimation result storage unit 428 are shown as different functional blocks in FIG. 5, the functions of both storage units may be provided by the same storage medium or by different storage media.

The accelerometer 420 functions as a motion detection unit that detects acceleration (movement) of the wireless terminal 40-1. The moved distance calculating unit 424 calculates the movement speed of the wireless terminal 40-1 in a given period from the history of the acceleration of the wireless terminal 40-1 obtained by the accelerometer 420. The moved distance calculating unit 424 is also capable of calculating the moved distance by integrating the movement speed during a given period. Note that the accelerometer 420 is described above merely as one example of a motion detection unit and a "motion detection unit" for the present disclosure is not limited to the accelerometer 420. For example, it is possible to use a compass, a gyrosensor or other type of sensor as the motion detection unit.

The estimation result storage unit 428 stores previous position estimation results for the wireless terminal 40-1 produced by the position estimating unit 436. Specific examples of the position estimation results stored by the estimation result storage unit 428 will now be described with reference to FIG. 6.

FIG. 6 is a diagram useful in explaining specific examples of position estimation results stored by the estimation result storage unit 428. As shown in FIG. 6, the estimation result storage unit 428 stores position information of the wireless terminal 40-1 estimated in the past by the position estimating unit 436 in association with the time at which such estimates were made.

The reference area determining unit (limited range determining unit) 432 reads the previous estimated position information from the estimation result storage unit 428 and determines a reference area (limited range) that uses a position shown by the estimated position information as a standard. The position estimating unit 436 estimates the position of the wireless terminal 40-1 based on the position information of the base stations 30 whose position information stored in the base station information storage unit 416 is inside the reference area and the signal strength information of wireless signals transmitted from such base stations 30. The reference area will now be described in detail with reference to FIG. 7.

Figure 7:
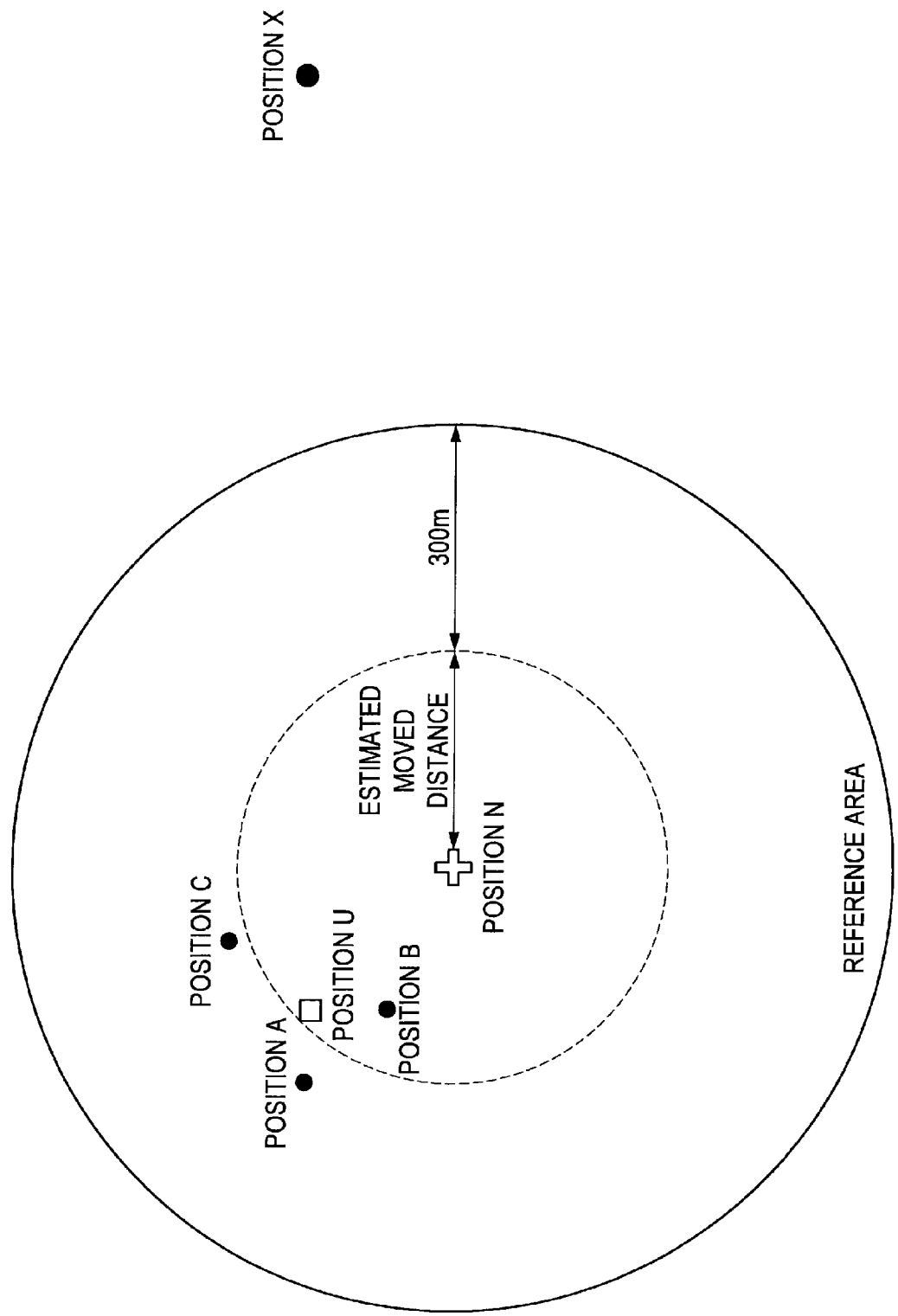
FIG. 7 is a diagram useful in explaining a specific example of a reference area.

FIG. 7 is a diagram useful in explaining a specific example of the reference area. The position N shown in FIG. 7 is the previous position estimation result. The wireless terminal 40-1 is thought to be located in a range (the range shown by the broken line in FIG. 7) that is within the estimated distance moved by the wireless terminal 40 from the time of the previous position estimation calculated by the moved distance calculating unit 424 from the position N.

Accordingly, base stations that transmit wireless signals that can be received by the wireless terminal 40-1 at the present time are thought to be located in a region that is centered on the position N and has a sum of the estimated moved distance and the signal range of the base stations 30 as a radius. For this reason, if the typical signal range (area range) of a base station 30 is 300 m, as shown in FIG. 7, the reference area determining unit 432 determines, as the reference area, a region that is centered on the position N and has a value produced by adding the estimated moved distance and 300 m as a radius.

In this case, the position A to the position C are inside the reference area and the position X is outside the reference area. For this reason, the position estimating unit 436 estimates the position U of the wireless terminal 40-1 according to Formula 1 described above, for example, based on the position information A to position information C of the base stations 30A to 30C showing the position A to the position C stored in the base station information storage unit 416 and the signal strength information of the wireless signals transmitted from the base stations 30A to 30C.

Meanwhile, the position estimating unit 436 does not use the position information X of the base station 30X showing the position X stored in the base station information storage unit 416 and the signal strength information of the wireless signal transmitted from the base station 30X in position estimation for the wireless terminal 40-1. In this way, according to the first embodiment of the present disclosure, by not using the position information of a base station 30 that has a high probability of being erroneous and the signal strength information of the wireless signal from such base station 30 in position estimation, it is possible to suppress a drop in the precision of the position estimation.

2-2: Operation of Wireless Terminal According to First Embodiment

The configuration of the wireless terminal 40-1 according to the first embodiment of the present disclosure has been described above. Next, the operation of the wireless terminal 40-1 according to the first embodiment will be described with reference to FIG. 8.

Figure 8:
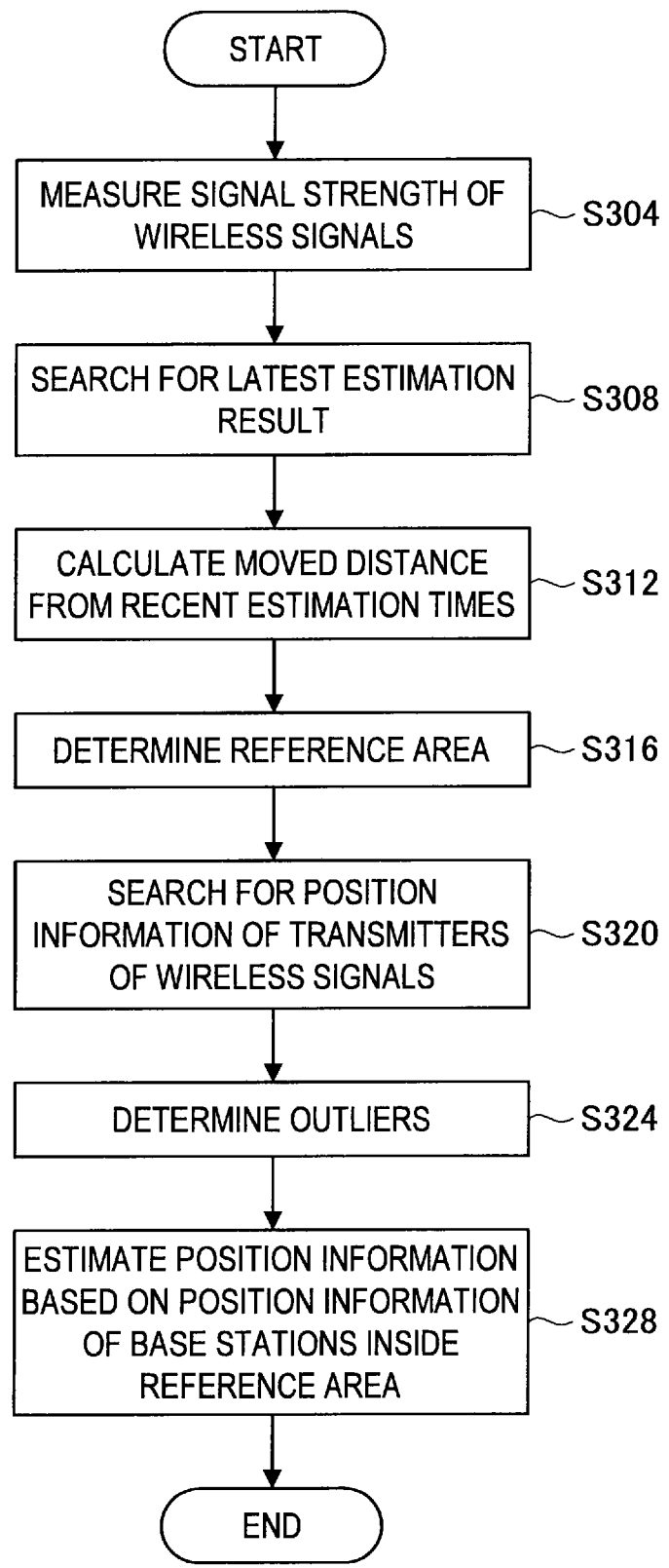
FIG. 8 is a flowchart showing the operation of the wireless terminal according to the first embodiment.

FIG. 8 is a flowchart showing the operation of the wireless terminal 40-1 according to the first embodiment. As shown in FIG. 8, first, the measurement unit 414 of the wireless terminal 40-1 measures the signal strengths of the wireless signals received by the communication unit 412 from the base stations 30 in the periphery (S304).

Also, the reference area determining unit 432 searches the estimation result storage unit 428 for the most recent position estimation result of the wireless terminal 40-1 (S308) and the moved distance calculating unit 424 calculates the moved distance of the wireless terminal 40-1 from the most recent time at which position estimation was carried out (S312).

Next, the reference area determining unit 432 determines the reference area based on the most recent position estimation result for the wireless terminal 40-1 and the moved distance calculated by the moved distance calculating unit 424 (S316).

After this, the position estimating unit 436 searches the base station information storage unit 416 for position information of the base stations that transmitted the wireless signals whose signal strengths have been measured by the measurement unit 414 (S320). The position estimating unit 436 then determines outliers that are position information outside the reference area out of the pieces of position information that have been found (S324). Next, the position estimating unit 436 estimates the position information of the wireless terminal 40-1 based on the position information of the base stations 30 inside the reference area (S328).

3. SECOND EMBODIMENT

The first embodiment of the present disclosure has been described above. Next, a second embodiment of the present disclosure will be described. As described in detail below, the second embodiment of the present disclosure differs to the first embodiment in that the reference area is determined in accordance with a position determination result produced by a different method to the position estimating unit 436.

3-1: Configuration of Wireless Terminal According to Second Embodiment

Figure 9:
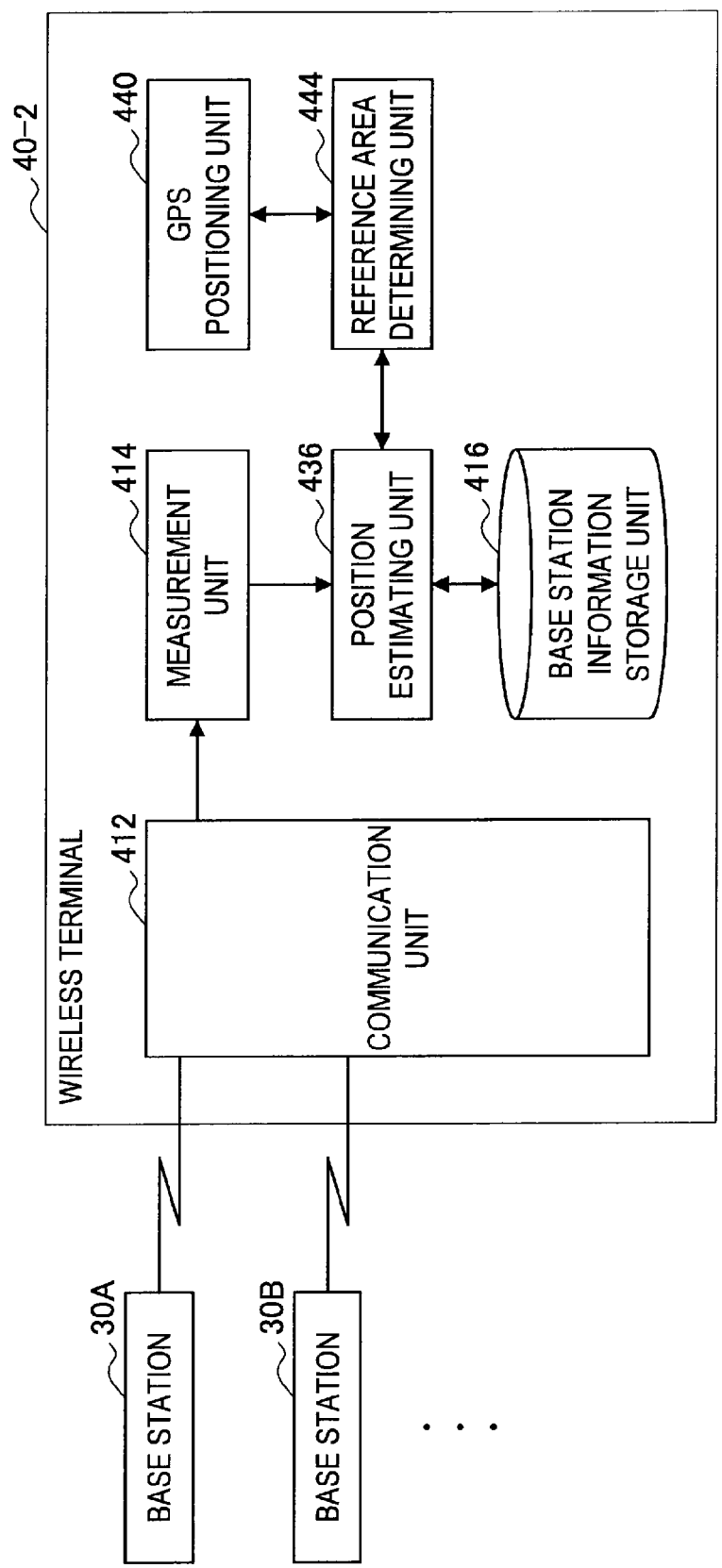
FIG. 9 is a functional block diagram showing the configuration of a wireless terminal according to a second embodiment of the present disclosure.

FIG. 9 is a functional block diagram showing the configuration of a wireless terminal 40-2 according to the second embodiment of the present disclosure. As shown in FIG. 9, the wireless terminal 40-2 according to the second embodiment includes the communication unit 412, the measurement unit 414, the base station information storage unit 416, a GPS positioning unit 440, and a reference area determining unit 444. Note that since functional blocks such as the communication unit 412, the measurement unit 414, and the base station information storage unit 416 are the same as those described in the first embodiment, detailed description thereof is omitted here.

The GPS positioning unit 440 receives navigation messages from satellites and calculates the present position of the wireless terminal 40-2 from ephemeris information included in the navigation messages. Note that the GPS positioning unit 440 is merely one example of a position determining unit that determines a position according to a different method to the position estimating unit 436 and such "position determining unit" can be realized by a variety of implementations.

The reference area determining unit 444 (limited range determining unit) determines the reference area with the present position of the wireless terminal 40-2 calculated by the GPS positioning unit 440 as a standard. The position estimating unit 436 estimates the position of the wireless terminal 40-2 based on the position information of the base stations 30 whose position information stored in the base station information storage unit 416 is inside the reference area and signal strength information for the wireless signals transmitted from such base stations 30. The reference area will now be described in more detail with reference to FIG. 10.

Figure 10:
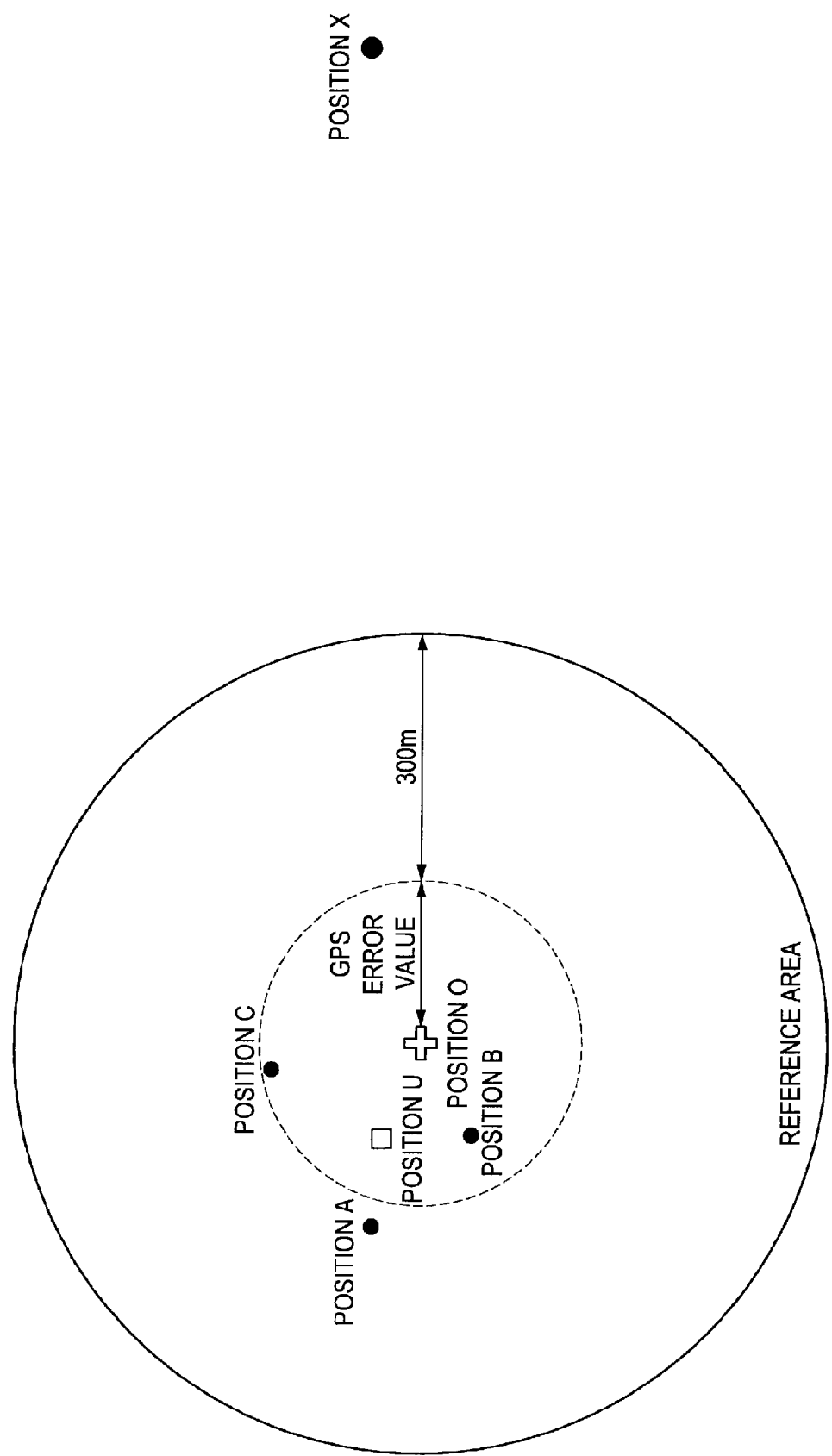
FIG. 10 is a diagram useful in explaining a specific example of a reference area.

FIG. 10 is a diagram showing a specific example of the reference area. The position O shown in FIG. 10 is the positioning result produced by the GPS positioning unit 440. The wireless terminal 40-2 is believed to be located in a region that is within the range of the GPS positioning error from the position O (i.e., in the region shown by the broken line shown in FIG. 10).

Accordingly, the base stations that transmitted the wireless signals that can be received at the present time by the wireless terminal 40-2 are believed to be located in a region that is centered on the position O and has the sum of the GPS positioning error and the signal range of a base station 30 as a radius. For this reason, if the typical signal range (area range) of a base station 30 is 300 m, as shown in FIG. 10, the reference area determining unit 444 determines, as the reference area, a region that is centered on the position O and has a value produced by adding the GPS positioning error and 300 m as a radius.

In this case, the position A to the position C are inside the reference area and the position X is outside the reference area. For this reason, the position estimating unit 436 estimates the position U of the wireless terminal 40-2 according to Formula 1 described above, for example, based on the position information A to position information C of the base stations 30A to 30C showing the position A to the position C stored in the base station information storage unit 416 and the signal strength information of the wireless signals transmitted from the base stations 30A to 30C.

Meanwhile, the position estimating unit 436 does not use the position information X of the base station 30X showing the position X stored in the base station information storage unit 416 and the signal strength information of the wireless signal transmitted from the base station 30X in position estimation of the wireless terminal 40-2. In this way, according to the second embodiment of the present disclosure, in the same way as the first embodiment, by not using the position information of a base station 30 that has a high probability of being erroneous and the signal strength information of the wireless signal from such base station 30 in position estimation, it is possible to suppress a drop in the precision of the position estimation.

3-2: Operation of Wireless Terminal According to the Second Embodiment

The configuration of the wireless terminal 40-2 according to the second embodiment of the present disclosure has been described above. Next, the operation of the wireless terminal 40-2 according to the second embodiment will be described with reference to FIG. 11.

Figure 11:
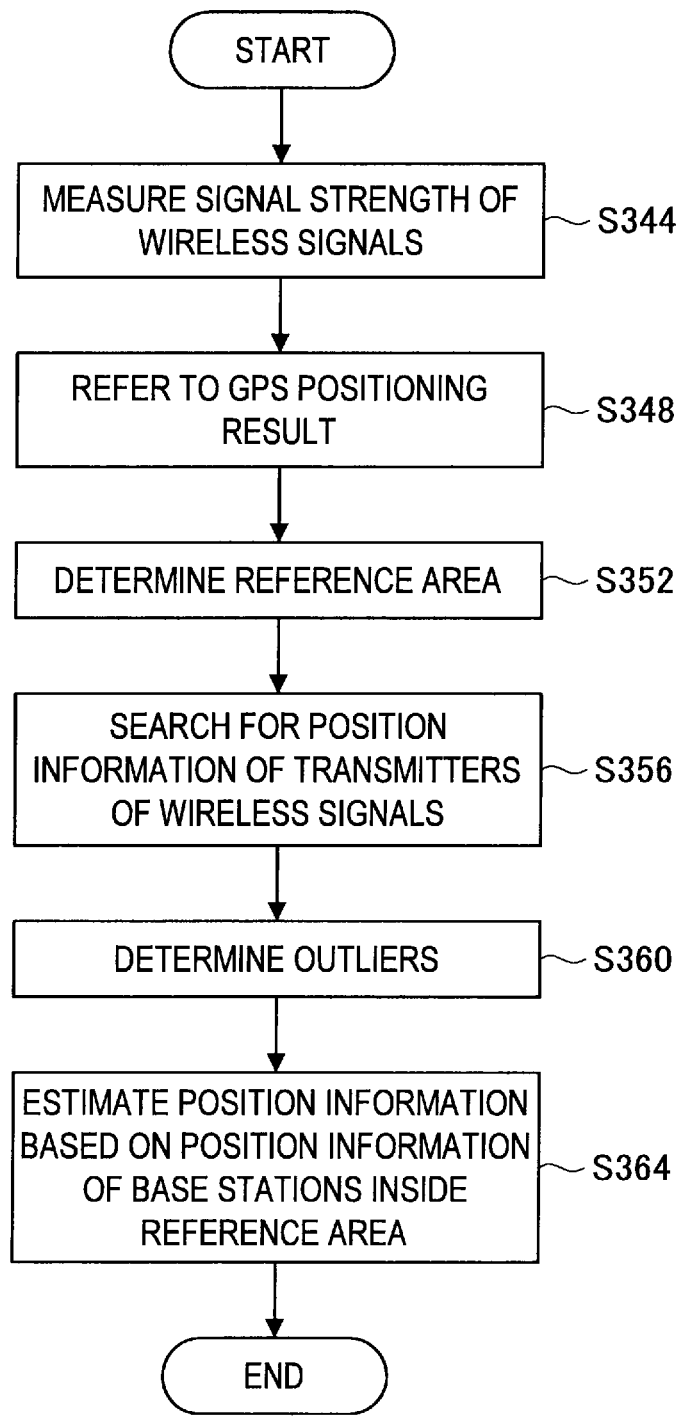
FIG. 11 is a flowchart showing the operation of the wireless terminal according to the second embodiment.

FIG. 11 is a flowchart showing the operation of the wireless terminal 40-2 according to the second embodiment. As shown in FIG. 11, first, the measurement unit 414 of the wireless terminal 40-2 measures the signal strengths of the wireless signals received by the communication unit 412 from the base stations 30 in the periphery (S344). Also, the GPS positioning unit 440 calculates the present position of the wireless terminal 40-2 (S348). Note that the processing in S344 and S348 may be implemented in parallel.

The reference area determining unit 444 then determines the reference area based on the positioning result produced by the GPS positioning unit 440 (S352). After this, the position estimating unit 436 searches the base station information storage unit 416 for position information of the base stations that transmitted the wireless signals whose signal strengths have been measured by the measurement unit 414 (S356).

Next, the position estimating unit 436 determines outliers that are position information outside the reference area out of the pieces of position information that have been found (S360). The position estimating unit 436 then estimates the position information of the wireless terminal 40-2 based on the position information of the base stations 30 inside the reference area (S364).

4. THIRD EMBODIMENT

The second embodiment of the present disclosure has been described above. Next, a wireless terminal 40-3 according to a third embodiment of the present disclosure will be described in detail with reference to FIGS. 12 to 16.

4-1: Configuration of Wireless Terminal According to Third Embodiment

Figure 12:
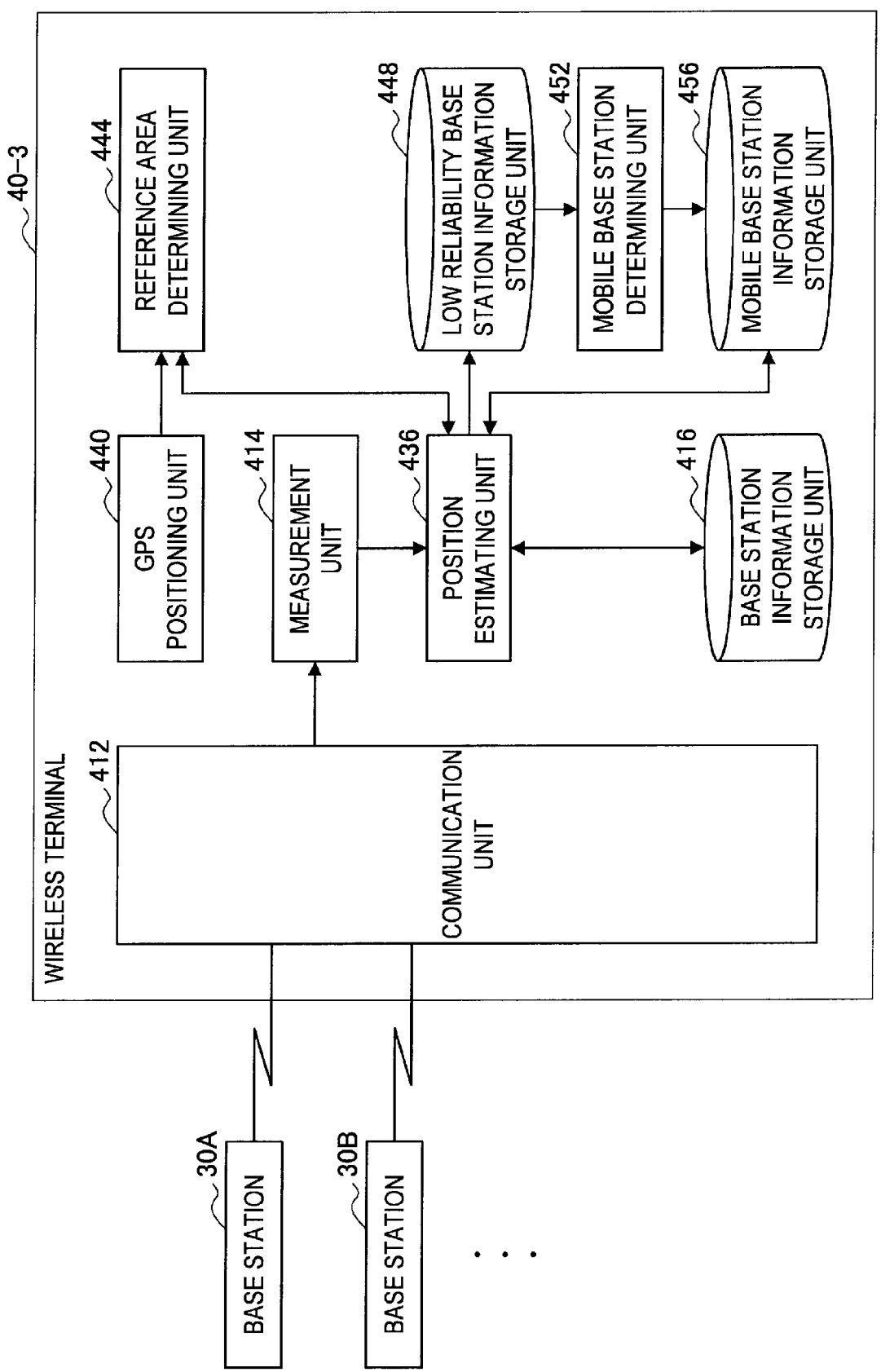
FIG. 12 is a functional block diagram showing the configuration of a wireless terminal according to a third embodiment of the present disclosure.

FIG. 12 is a functional block diagram showing the configuration of the wireless terminal 40-3 according to the third embodiment of the present disclosure. As shown in FIG. 12, the wireless terminal 40-3 according to the third embodiment includes the communication unit 412, the measurement unit 414, the base station information storage unit 416, the GPS positioning unit 440, the reference area determining unit 444, a low reliability base station information storage unit 448, a mobile base station determining unit 452, and a mobile base station information storage unit 456.

Note that since functional blocks such as the communication unit 412, the measurement unit 414, the base station information storage unit 416, the GPS positioning unit 440, and the reference area determining unit 444 are the same as those described in the second embodiment, detailed description thereof is omitted here.

As described above in the second embodiment and the like, the position estimating unit 436 searches the base station information storage unit 416 for position information of the base stations that transmitted the wireless signals whose signal strengths have been measured by the measurement unit 414 and determines outliers that are position information outside the reference area out of the pieces of position information that have been found.

Here, the position information determined by the position estimating unit 436 to be an outlier is believed to be position information of a base station 30 that has moved after registration in the base station information storage unit 416. This means that there is the possibility that a base station 30 with position information determined to be an outlier by the position estimating unit 436 is a mobile base station carried by the user. However, there are also cases where even a home base station will move due to movement of the user. For this reason, in the present embodiment, it is specified whether the base station 30 is a mobile base station based on the frequency with which, or the number of times that, the position information has been determined to be an outlier. This is described in detail below.

The low reliability base station information storage unit 448 stores the base station IDs of base stations with position information that has been determined by the position estimating unit 436 to be an outlier. Specific examples of the low reliability base station information stored by the low reliability base station information storage unit 448 will now be described with reference to FIG. 13.

FIG. 13 is a diagram useful in showing specific examples of the low reliability base station information stored by the low reliability base station information storage unit 448. As shown in FIG. 13, the low reliability base station information storage unit 448 stores base station IDs showing low reliability base stations in association with report times showing when such base stations were reported (added) as low reliability base stations. For example, in FIG. 13, it is shown that the base station 30X was reported as a low reliability base station at "2010/7/14 10:34:56". In this way, the low reliability base station information storage unit 448 functions as a history information storage unit that stores history information for each piece of low reliability base station information that has been reported.

The mobile base station determining unit 452 refers to the low reliability base station information storage unit 448 and determines that a base station 30 that has been reported as a low reliability base station with high frequency is a mobile base station. For example, the mobile base station determining unit 452 may determine that a base station 30 that has been reported as a low reliability base station more than a set number of times, such as twice, five times, or ten times within a specified period, such as one week, one month, or three months, is a mobile base station.

In more detail, for the example shown in FIG. 13, since the base station 30X has been reported as a low reliability base station four times in the period from "2010/7/14" to "2010/7/18", the mobile base station determining unit 452 may determine that the base station 30X is a mobile base station.

Information on the base station 30 determined by the mobile base station determining unit 452 to be a mobile base station is added to the mobile base station information storage unit 456. For example, when the base station 30X has been determined to be a mobile base station by the mobile base station determining unit 452, as shown in FIG. 14, the base station ID of the base station 30X is added to the mobile base station information storage unit 456. Note that the base station ID may be added to the mobile base station information storage unit 456 in an offline manner based on a base station ID reported by the user and/or information reported from a vendor or carrier.

The information on the base station 30 determined by the mobile base station determining unit 452 to be a mobile base station may be deleted from the base station information storage unit 416. For example, when the base station 30X has been determined by the mobile base station determining unit 452 to be a mobile base station, the base station information, such as the position information and the like, of the base station 30X may be deleted from the base station information storage unit 416.

Since a mobile base station is not present at a fixed location as described above, if information on such a mobile base station were used when estimating the position of the wireless terminal 40-3, there would be the risk of a fall in the precision of the position estimation.

For this reason, the position estimating unit 436 of the wireless terminal 40-3 may estimate the position of the wireless terminal 40-3 by selectively using signal strength information of base stations 30 whose position information show positions in the reference area and that are not stored in the mobile base station information storage unit 456 as mobile base stations, and also the position information of such base stations 30. According to this configuration, it is possible to improve the precision of position estimation for a wireless terminal 40.

4-2: Operation of Wireless Terminal According to Third Embodiment

The configuration of the wireless terminal 40-3 according to the third embodiment of the present disclosure has been described above. Next, the operation of the wireless terminal 40-3 according to the third embodiment will be described with reference to FIGS. 15 and 16.

Figure 15:
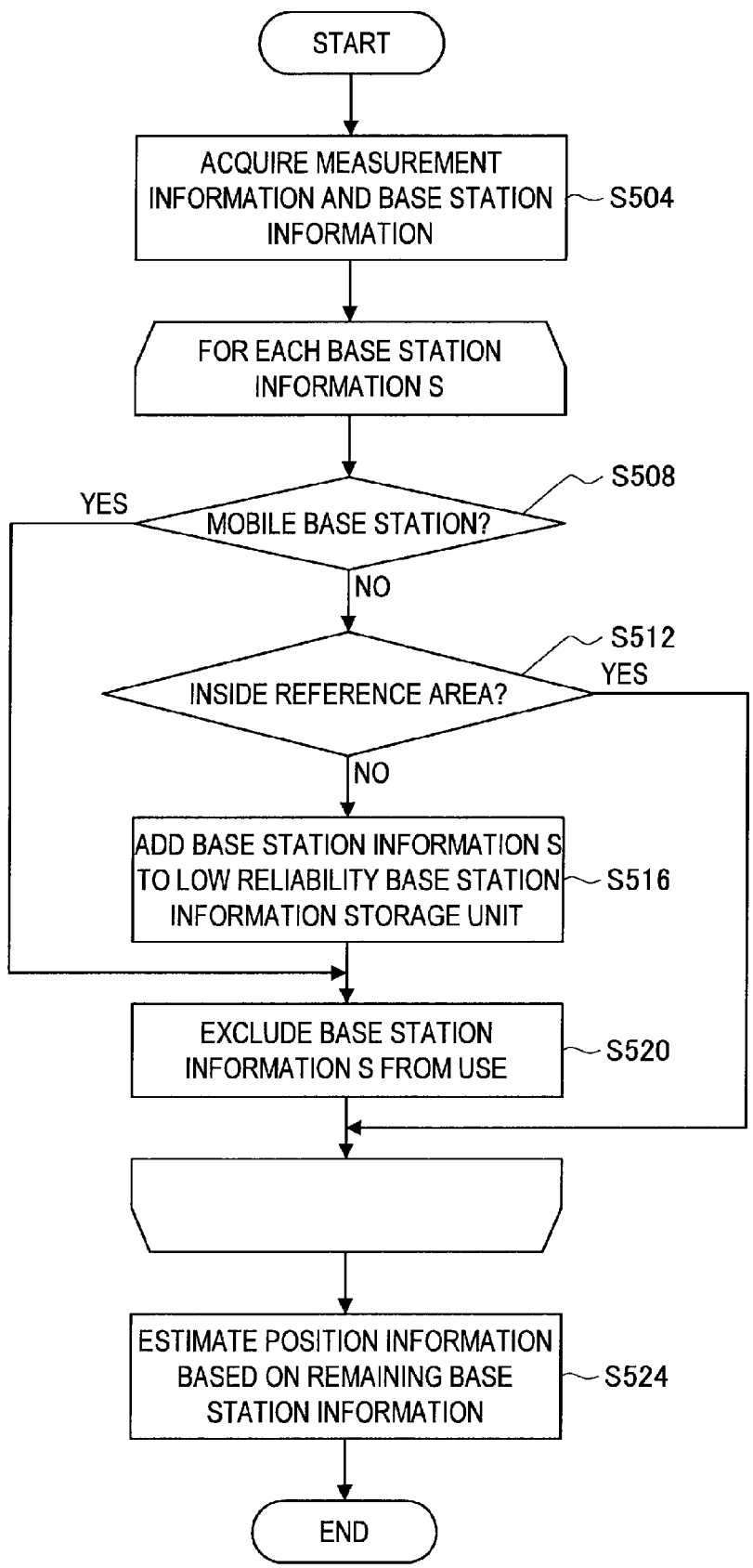
FIG. 15 is a flowchart showing an example operation of the wireless terminal according to the third embodiment.
Figure 16:
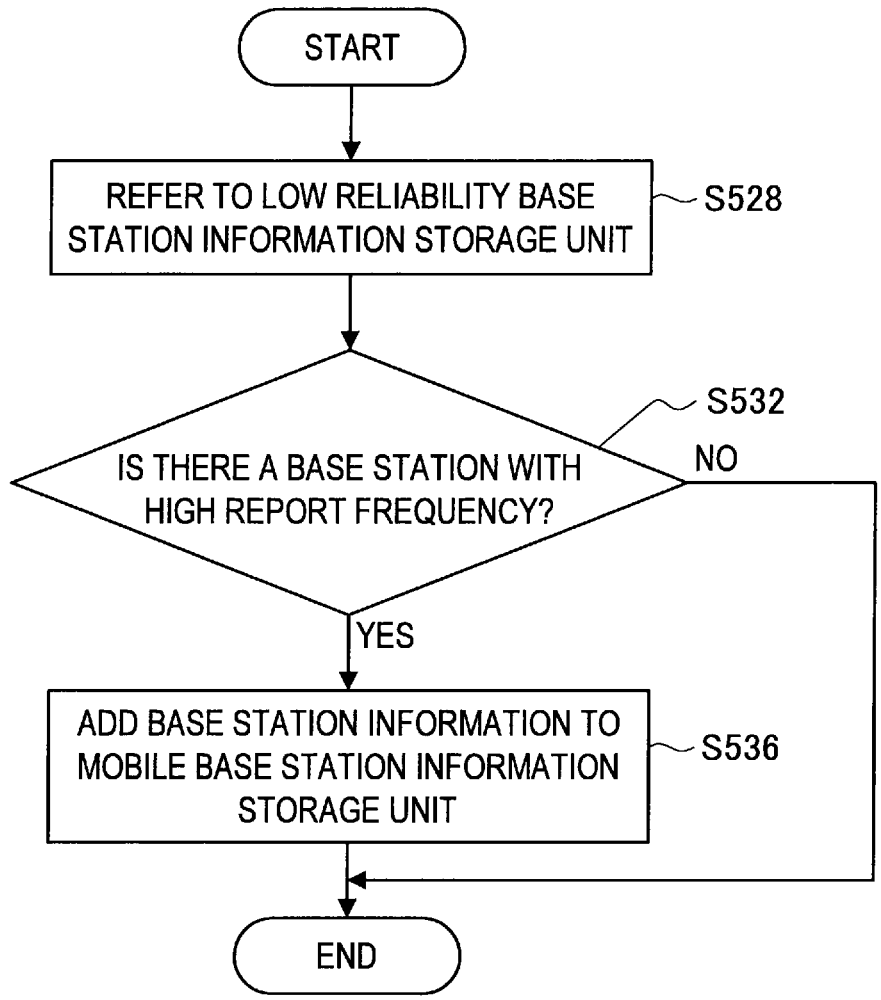
FIG. 16 is a flowchart showing an example operation of the wireless terminal according to the third embodiment.

FIGS. 15 and 16 are flowcharts showing an example operation of the wireless terminal 40-3 according to the third embodiment. As shown in FIG. 15, first, when measurement information for wireless signals has been acquired by the measurement unit 414 of the wireless terminal 40-3, the position estimating unit 436 acquires, from the base station information storage unit 416, the base station information of the base stations that transmitted such wireless signals (S504).

After this, the wireless terminal 40-3 carries out the processing in S508 to S520 for each piece of base station information S acquired in S504. More specifically, the position estimating unit 436 refers to the mobile base station information storage unit 456 and determines whether the base station information S is base station information of a base station 30 registered as a mobile base station (S508).

Also, the position estimating unit 436 determines whether the position information included in the base station information S is inside the reference area (S512). After this, if it has been determined that the position information included in the base station information S is outside the reference area, the wireless terminal 40-3 adds the base station information S to the low reliability base station information storage unit 448 (S516) and excludes such base station information S from use in position estimation (S520). Also, if it has been determined in S508 that the base station information S is base station information of a base station 30 registered as a mobile base station, the wireless terminal 40-3 excludes such base station information S from use in position estimation (S520).

The position estimating unit 436 then uses the remaining base station information and measurement information to estimate the position information of the wireless terminal 40-3 (S524).

Meanwhile, the mobile base station determining unit 452 executes the processing in S528 to S536 shown in FIG. 16 at arbitrary timing, such as when a specified interval has passed or when new information has been added to the low reliability base station information storage unit 448.

More specifically, the mobile base station determining unit 452 refers to the low reliability base station information storage unit 448 (S528) and determines whether a base station 30 has been reported as a low reliability base station with high frequency (S532). After this, the mobile base station determining unit 452 adds information relating to a base station 30 that has been reported as a low reliability base station with high frequency to the mobile base station information storage unit 456 (S536). Note that the mobile base station determining unit 452 may delete information relating to the base station 30 that has been reported as a low reliability base station with high frequency from the base station information storage unit 416.

5. FOURTH EMBODIMENT

The first to third embodiments of the present disclosure have been described above.

In the first to third embodiments of the present disclosure, examples have been described where a function for determining outliers among the base stations 30, a position estimating function, a function for determining mobile base stations, and the like have been implemented in a wireless terminal 40. However, as described below as the fourth embodiment, it is also possible to implement such functions in a position estimating apparatus 20.

5-1. Configuration of Position Estimating System According to Fourth Embodiment

Figure 17:
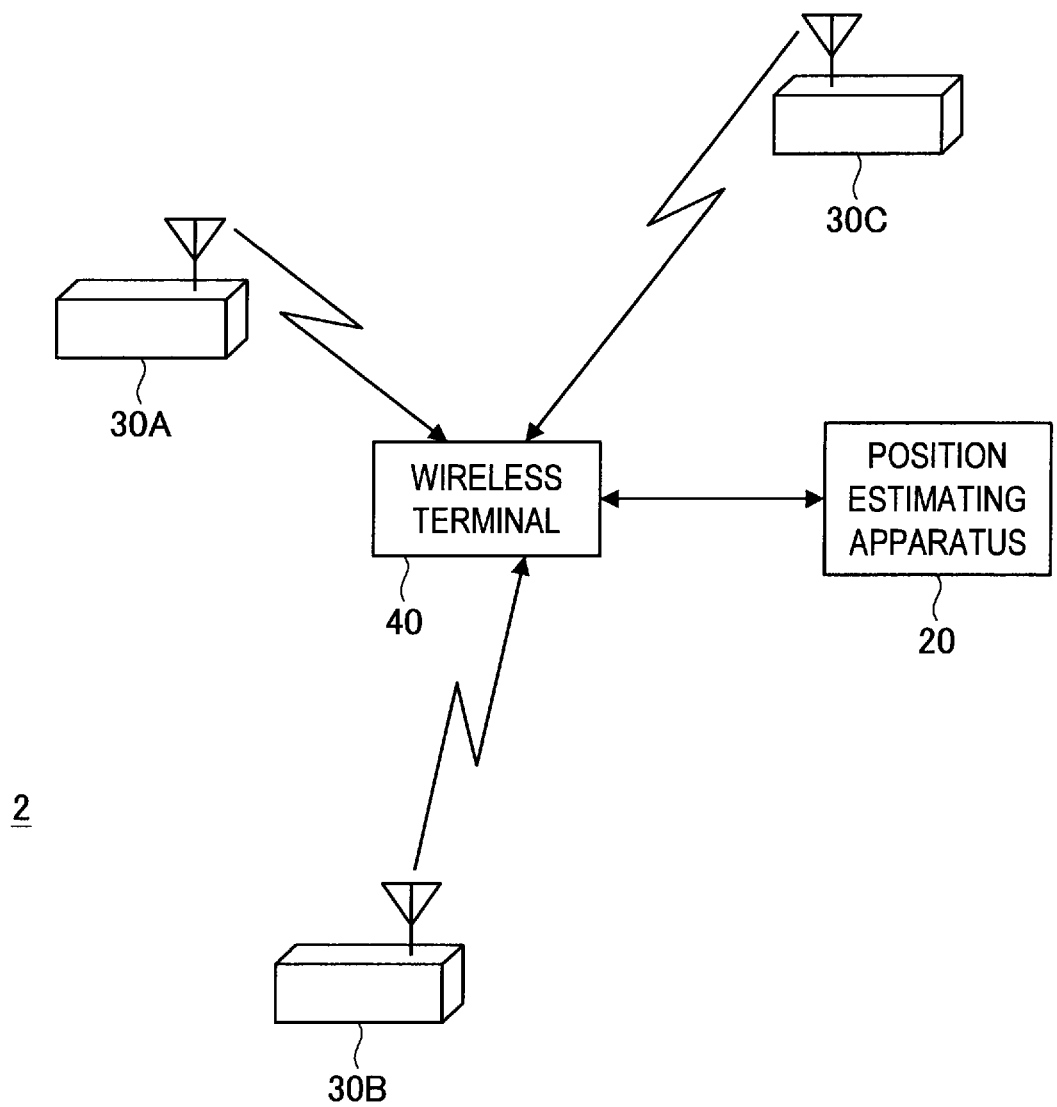
FIG. 17 is a diagram useful in explaining the configuration of a position estimating system according to a fourth embodiment.

FIG. 17 is a diagram useful in showing the configuration of a position estimating system 2 according to the fourth embodiment. As shown in FIG. 17, the position estimating system 2 according to the fourth embodiment includes a position estimating apparatus 20, a plurality of base stations 30, and a wireless terminal 40.

On receiving a wireless signal transmitted from a base station 30 (for example, a beacon signal), the wireless terminal 40 is capable of measuring the signal strength of the wireless signal. After this, the wireless terminal 40 transmits measurement information including the measured signal strength information and the base station ID of the base station 30 to the position estimating apparatus 20. The wireless terminal 40 also transmits reference area information for enabling the position estimating apparatus 20 to specify a reference area. Note that the previous estimated position and estimated moved distance described in the first embodiment and the positioning result produced by GPS described in the second embodiment can be given as examples of the reference area information.

Note that there are no particular limitations on the format for expressing the signal strength information. As examples, the signal strength information may be expressed in "Dbm" units or by a value, such as "40%" or "80%", that is the measured value expressed as a proportion of a set value (for example, a saturation value for the signal strength), or may be a converted distance value for the signal strength.

The position estimating apparatus 20 stores position information for each base station 30 and is capable of estimating the position information of a wireless terminal 40 based on the position information of the respective base stations 30 and measurement information received from the wireless terminal 40. The position estimating apparatus 20 then transmits the estimated position information to the wireless terminal 40.

Note that the position estimating apparatus 20 may communicate with the wireless terminal 40 via a communication network that includes wired or wireless transfer paths. More specifically, the communication network may include a public network such as the Internet, a telephone network, or a satellite communication network, various types of LAN (Local Area Network) including Ethernet (registered trademark), an LTE core network, a WAN (Wide Area Network), and the like. The communication network may also include a dedicated network such as an IP-VPN (Internet Protocol-Virtual Private Network).

As described above, in the fourth embodiment, the position estimation for the wireless terminal 40 is carried out by the position estimating apparatus 20. In the same way, in the fourth embodiment, the determination of the reference area, the determination of outliers, the determination of mobile base stations, and the like may also be carried out by the position estimating apparatus 20. The configuration and operation of the position estimating apparatus 20 according to the fourth embodiment will now be described.

Figure 18:
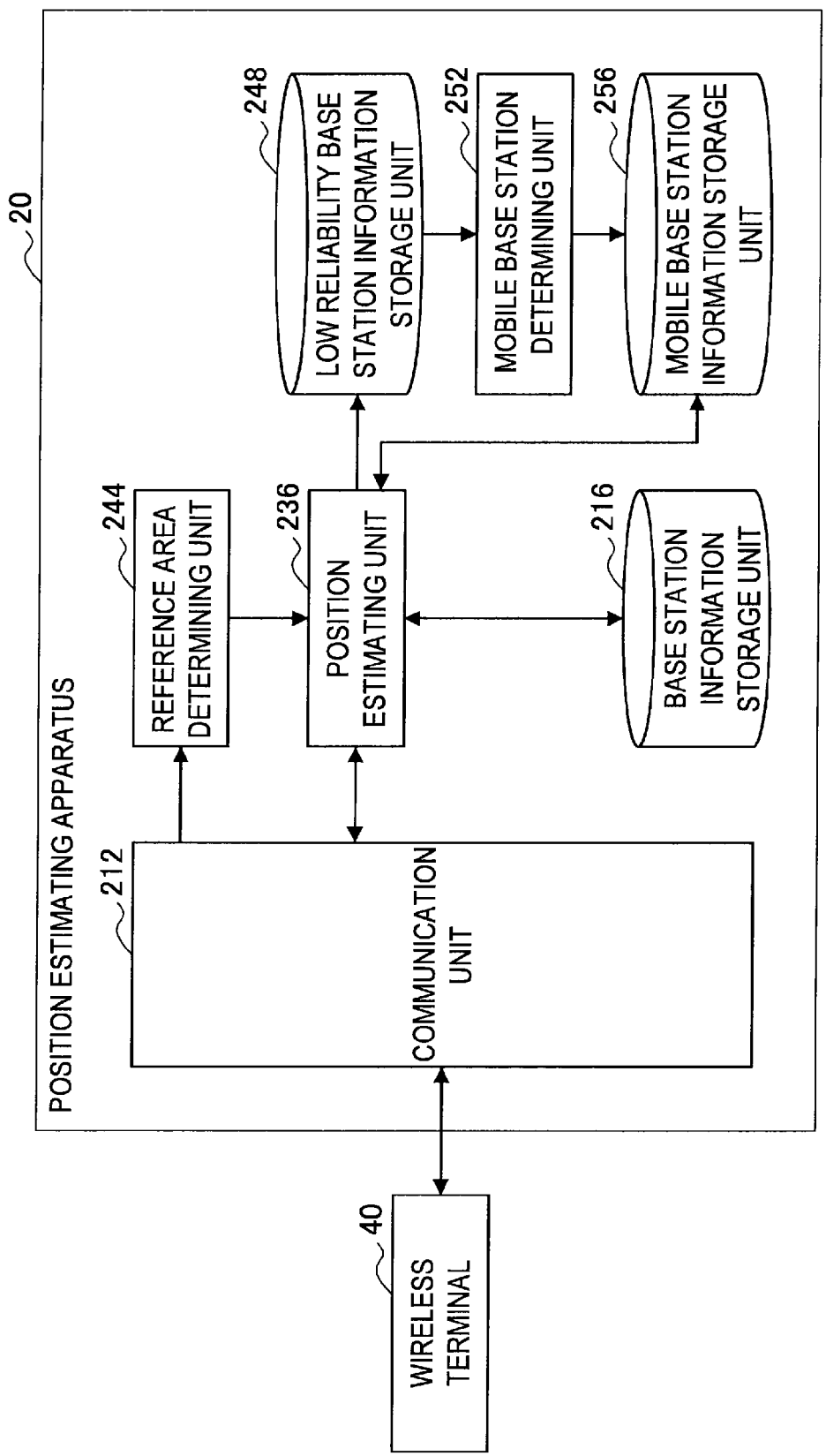
FIG. 18 is a functional block diagram showing the configuration of a position estimating apparatus according to the fourth embodiment.

5-2: Configuration of Position Estimating Apparatus According to Fourth Embodiment FIG. 18 is a functional block diagram showing the configuration of the position estimating apparatus 20 according to the fourth embodiment of the present disclosure. As shown in FIG. 18, the position estimating apparatus 20 according to the fourth embodiment includes a communication unit 212, a base station information storage unit 216, a position estimating unit 236, a reference area determining unit 244, a low reliability base station information storage unit 248, a mobile base station determining unit 252, and a mobile base station information storage unit 256.

The communication unit 212 is an interface for transmitting and receiving information to and from the wireless terminal 40. As one example, the communication unit 212 has functions as a reception unit that receives measurement information and reference area information from the wireless terminal 40 and as a transmission unit that transmits a position estimation result to the wireless terminal 40.

In the same way as the base station information storage unit 416 described above in the first to third embodiments, the base station information storage unit 216 stores base station information made up of base station IDs and position information of the respective base stations 30.

The reference area determining unit 244 determines the reference area based on the reference area information received by the communication unit 212 from the wireless terminal 40. Since methods of determining the reference area based on the reference area information were described in the first and second embodiments, detailed description thereof is omitted here.

However, when the position estimating apparatus 20 stores a history of the position estimation results for each wireless terminal 40, it is possible for the reference area determining unit 244 to specify the reference area based on the history of position estimation results stored in the position estimating apparatus 20 and an estimated moved distance received from the wireless terminal 40 as the reference area information.

Since the position estimating unit 236, the low reliability base station information storage unit 248, the mobile base station determining unit 252, and the mobile base station information storage unit 256 can be effectively the same configurations as the position estimating unit 436, the low reliability base station information storage unit 448, the mobile base station determining unit 452, and the mobile base station information storage unit 456 described in the third embodiment, detailed description thereof is omitted here.

In short, base station IDs showing base stations 30 that have low reliability as fixed base stations are recorded in the low reliability base station information storage unit 248 and the mobile base station determining unit 252 determines mobile base stations by referring to the low reliability base station information storage unit 248. Information relating to a base station 30 determined by the mobile base station determining unit 252 to be a mobile base station is added to the mobile base station information storage unit 256 and is deleted from the base station information storage unit 216.

The position estimating unit 236 estimates the position of the wireless terminal 40 by selectively using the measurement information of base stations 30 which have position information showing positions inside the reference area and are not stored in the mobile base station information storage unit 256 as mobile base stations, and also position information of such base stations 30.

5-3: Operation of the Position Estimating System According to the Fourth Embodiment The configuration of the position estimating apparatus 20 according to the fourth embodiment of the present disclosure has been described above. Next, the operation of the position estimating system 2 according to the fourth embodiment will be described with reference to FIG. 19.

FIG. 19 is a sequence chart showing the operation of the position estimating system 2 according to the fourth embodiment. As shown in FIG. 19, the wireless terminal 40 first measures the signal strengths of the wireless signals received from the base stations 30 in the periphery (S604). The wireless terminal 40 acquires the reference area information (S508) and transmits the reference area information and the measurement information acquired in S604 to the position estimating apparatus 20 (S612).

After this, the position estimating unit 236 of the position estimating apparatus 20 searches the base station information storage unit 216 for base station information relating to the measurement information received from the wireless terminal 40 (S616). The reference area determining unit 244 determines the reference area based on reference area information received from the wireless terminal 40 (S620).

In addition, the position estimating unit 236 determines mobile base stations and determines outliers as described above and estimates the position of the wireless terminal 40 using the measurement information of base stations 30 that have position information showing positions inside the reference area and have not been stored in the mobile base station information storage unit 256, and position information of such base stations 30 (S628). After this, the communication unit 212 transmits the position information of the wireless terminal 40 estimated by the position estimating unit 236 to the wireless terminal 40 (S632).

6. CONCLUSION

As described above, according to the embodiments of the present disclosure, by estimating the position of the wireless terminal 40 based on the position information of the base stations 30 showing positions in the reference area, it is possible to improve the precision of position estimation for the wireless terminal 40.

In addition, according to the third and fourth embodiments of the present disclosure, by estimating the position of the wireless terminal 40 without using the position information of base stations 30 that have a high probability of being mobile base stations, it is possible to significantly improve the precision of the position estimation.

Although preferred embodiments of the present disclosure have been described in detail with reference to the attached drawings, the present disclosure is not limited to the above examples. It should be understood by those skilled in the art that various modifications, combinations, sub-combinations and alterations may occur depending on design requirements and other factors insofar as they are within the scope of the appended claims or the equivalents thereof.

As one example, the respective steps in the processing of the position estimating system 2 or the wireless terminal 40 in this specification do not need to be carried out in a time series in the order in which such steps are given in the sequence charts or flowcharts. For example, the respective steps in the processing of the wireless terminal 40 may be carried out in a different order to the order written in the flowcharts and/or may be carried out in parallel.

It is also possible to produce a computer program for causing hardware such as a CPU, a ROM, and a RAM incorporated in the position estimating apparatus 20 or the wireless terminal 40 to achieve the same functions as the respective structural elements of the position estimating apparatus 20 or the wireless terminal 40 described earlier. A storage medium on which such computer program is recorded may also be provided.

REFERENCE SIGNS LIST

20 Position estimating apparatus
30 Base station
40, 40-1, 40-2, 40-3 Wireless terminal
212, 412 Communication unit
216, 416 Base station information storage unit
236, 436 Position estimating unit
244, 432, 444 Reference area determining unit

248, 448 Low reliability base station information storage unit
252, 452 Mobile base station determining unit
256, 456 Mobile base station information storage unit
420 Accelerometer
424 Moved distance calculating unit
428 Estimation result storage unit
440 GPS positioning unit

The invention claimed is:

1. A position estimation apparatus, comprising:
a reference area determining unit configured to determine a reference area that includes a position of a mobile communication station, and
a position estimation unit configured to estimate the position of said mobile communication station based on position information of a plurality of transmitters within said reference area,
wherein the reference area is defined by a radius and a center point, the radius including a predetermined communication range of at least one of said plurality of transmitters added to a specified amount.

2. The apparatus of claim 1, wherein:
said reference area determining unit is configured to determine said reference area by adding an estimated move distance of said mobile communication station as the specified amount with the predetermined communication range of the at least one of said plurality of transmitters.

3. The apparatus of claim 2, further comprising:
a movement detector configured to estimate the estimated move distance of said mobile communication station.

4. The apparatus of claim 3, wherein
said movement detector is an accelerometer.

5. The apparatus of claim 1, further comprising:
a GPS-based location device configured to detect location information based on wireless satellite transmissions, wherein
said reference area determining unit is configured to determine the reference area by adding a GPS uncertainty amount as the specified amount with the predetermined communication range of the at least one of said plurality of transmitters.

6. The apparatus of claim 1, further comprising:
a computer readable storage device configured to store a previous position estimation result for said mobile communication station in association with time, wherein
and said reference area determining unit is configured to determine said reference area by using the previous position estimation result as a standard.

7. The apparatus of claim 6, wherein:
said reference area determining unit is configured to determine the reference area by calculating an estimated move distance of said mobile communication station.

8. The apparatus of claim 6, wherein
said position estimation unit is configured to estimate the estimated move distance of said mobile communication station by measuring a propagation distance from the plurality of transmitters.

9. The apparatus of claim 1, wherein
said position estimation unit is configured to exclude transmitters outside of the reference area from consideration when estimating the position of said mobile communication station.

10. The apparatus of claim 1, wherein
the position estimation unit is configured to estimate the position of the mobile communication station by calculation of $$O = \frac{1}{W} \cdot \sum_i (Wi \cdot Ai)$$ (Mathematical Formula 1)

$$Wi = \frac{1}{distS(O, Ai)}$$ (Mathematical Formula 2)

$$W = \sum_i Wi,$$ (Mathematical Formula 3)

(Mathematical Formula 3), wherein
O is a position, Ai is position information of an ith transmitter, and Wi is a weighting coefficient.

11. The apparatus of claim 9, further comprising:
a computer readable storage unit that stores transmitter reliability information regarding whether a particular transmitter has been detected as having a low reliability with at least a predetermined frequency of occurrence, wherein
said position estimation unit is configured to exclude transmitters having a stored reliability below a predetermined threshold when estimating the position of the mobile communication station.

12. The apparatus of claim 9, wherein
said position estimation unit is configured to exclude transmitters having a received signal characteristic indicating the transmitter is outside of the reference area.

13. The apparatus of claim 1, further comprising:
a communications interface is configured to:
receive transmitter signal information and reference area information from said mobile communication station, and
send an estimate of said position of said mobile communication station to said mobile communication station.

14. The apparatus of claim 1, wherein
the position estimation apparatus includes the mobile communication station.

15. The apparatus of claim 6, wherein the center point is the previous position estimation result.

16. A position estimation method comprising:
determining with a processing device a reference area including a position of a mobile communication station; and
estimating the position of the mobile communication station based on position information of a plurality of transmitters within said reference area,
wherein the reference area is defined by a radius and a center point, the radius including a predetermined communication range of at least one of said plurality of transmitters added to a specified amount.

17. A computer readable storage device having computer readable instructions that when executed by a processing device perform a position estimation method comprising:
determining with the processing device a reference area including a position of a mobile communication station; and
estimating the position of the mobile communication station based on position information of a plurality of transmitters within said reference area,
wherein the reference area is defined by a radius and a center point, the radius including a predetermined communication range of at least one of said plurality of transmitters added to a specified amount.

18. A mobile communication station comprising:
a receiver that receives transmissions from a plurality of transmitters;
a reference area determining unit that determines a reference area that includes therein a position of the mobile communication station; and
a communication interface that
sends
signal information from said transmissions of said plurality of transmitters, and
said reference area to a remote device, and
receives from said remote device an estimated position of said mobile communication station after said remote device used said signal information and said reference area to estimate said position of said mobile communication station by using transmissions from a subset including at least two of said plurality of transmitters, which are located within said reference area and excluding transmissions from a subset of said plurality of transmitters, which are located outside of said reference area,
wherein said reference area is defined by a radius and a center point, the radius including a predetermined communication range of at least one of said plurality of transmitters added to a specified amount.

19. A position estimation method comprising:
receiving transmissions from a plurality of transmitters;
determining with a processing device a reference area that includes therein a position of a mobile communication station;
sending signal information from said transmissions of said plurality of transmitters to a remote device;
sending said reference area to the remote device; and
receiving from said remote device an estimated position of said mobile communication station after said remote device used said signal information and said reference area to estimate said position of said mobile communication station by using transmissions from a subset including at least two of said plurality of transmitters, which are located within said reference area and excluding transmissions from a subset of said plurality of transmitters, which are located outside of said reference area,
wherein said reference area is defined by a radius and a center point, the radius including a predetermined communication range of at least one of said plurality of transmitters added to a specified amount.

20. A computer readable storage device having computer readable instructions that when executed by a processing device perform a position estimation method comprising:
receiving transmissions from a plurality of transmitters;
determining with a processing device a reference area that includes therein a position of a mobile communication station;
sending signal information from said transmissions of said plurality of transmitters to a remote device;
sending said reference area to the remote device; and
receiving from said remote device an estimated position of said mobile communication station after said remote device used said signal information and said reference area to estimate said position of said mobile communication station by using transmissions from a subset including at least two of said plurality of transmitters, which are located within said reference area and excluding transmission from a subset of said plurality of transmitters, which are located outside of said reference area,
wherein said reference area is defined by a radius and a center point, the radius including a predetermined communication range of at least one of said plurality of transmitters added to a specified amount.

* * * * *